(12) United States Patent
Yang (10) Patent No.: US 7,409,466 B2
(45) Date of Patent: Aug. 5, 2008

(54) APPARATUS AND METHOD FOR MANAGING ADDRESS BOOK IN PORTABLE WIRELESS TERMINAL HAVING A RADIO FREQUENCY IDENTIFICATION (RFID) RECOGNITION SECTION

(75) Inventor: Sung-Chul Yang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 107 days.

(21) Appl. No.: 10/752,395

(22) Filed: Jan. 6, 2004

(65) Prior Publication Data
US 2005/0045719 A1 Mar. 3, 2005

(30) Foreign Application Priority Data
Aug. 6, 2003 (KR) .................... 10-2003-0054395

(51) Int. Cl.
*G06F 13/00* (2006.01)
*G06F 17/60* (2006.01)
(52) U.S. Cl. .................... 710/5; 710/33; 455/556.2; 707/1; 707/201; 235/385
(58) Field of Classification Search .............. 710/5, 710/33; 455/556.2, 556.1, 41.1; 707/9, 10, 707/1, 201; 235/385
See application file for complete search history.

(56) References Cited

U.S. PATENT DOCUMENTS

| | | | |
|---|---|---|---|
| 6,374,259 B1 * | 4/2002 | Celik | 707/104.1 |
| 6,708,176 B2 * | 3/2004 | Strunk et al. | 707/10 |
| 6,726,100 B2 * | 4/2004 | Lauper et al. | 235/380 |
| 6,748,402 B1 * | 6/2004 | Reeves et al. | 707/201 |
| 6,888,443 B2 * | 5/2005 | Ritter | 340/5.64 |
| 6,912,407 B1 * | 6/2005 | Clarke et al. | 455/556.2 |
| 6,967,566 B2 * | 11/2005 | Weston et al. | 340/323 R |
| 6,978,118 B2 * | 12/2005 | Vesikivi et al. | 455/41.1 |
| 2002/0156895 A1 * | 10/2002 | Brown | 709/226 |
| 2003/0179778 A1 * | 9/2003 | Guanter et al. | 370/503 |
| 2004/0093317 A1 * | 5/2004 | Swan | 707/1 |
| 2004/0198438 A1 * | 10/2004 | Song et al. | 455/556.1 |
| 2005/0177032 A1 * | 8/2005 | Grossinger et al. | 600/310 |

OTHER PUBLICATIONS

Microsoft Press Computer Dictionary, 1997, p. 137.*

* cited by examiner

*Primary Examiner*—Tammara R Peyton
(74) *Attorney, Agent, or Firm*—The Farrell Law Firm, PC (57) ABSTRACT

An apparatus and a method for managing an address book in a portable wireless terminal, allowing users to easily input private information into the apparatus. The apparatus includes an RFID recognition section for receiving information transmitted from an RFID chip after transmission of an electric wave, storing and reading received information, and converting read data into data suitable for an address book; a display section for displaying data for the address book management; a user command input section for inputting a command for the address book management by a user; an address book storage section for storing private information; and a control section for controlling an operation of the RFID recognition section, so as to transmit the converted data to the address book storage section according to a user command, thereby storing the data.

15 Claims, 5 Drawing Sheets

APPARATUS AND METHOD FOR MANAGING ADDRESS BOOK IN PORTABLE WIRELESS TERMINAL HAVING A RADIO FREQUENCY IDENTIFICATION (RFID) RECOGNITION SECTION

PRIORITY

This application claims priority to an application entitled "Apparatus And Method For Managing An Address Book In A Portable Wireless Terminal" filed in the Korean Intellectual Property Office on Aug. 6, 2003 and assigned Serial No. 2003-54395, the contents of which are hereby incorporated by reference.

BACKGROUND OF THE INVENTION

1. Field of the Invention

The present invention relates to an apparatus and a method for managing an address book in a portable wireless terminal, and more particularly to an apparatus and a method for managing an address book in a portable wireless terminal for allowing users to easily input private or personal information into the apparatus.

2. Description of the Related Art

Generally, in order to store a telephone number in a portable wireless terminal, a user directly inputs the telephone number by using a key pad, pushes a store button (a button or key for performing a store function from among menu keys), and must input a corresponding person's name by using the key pad.

Figure 1:
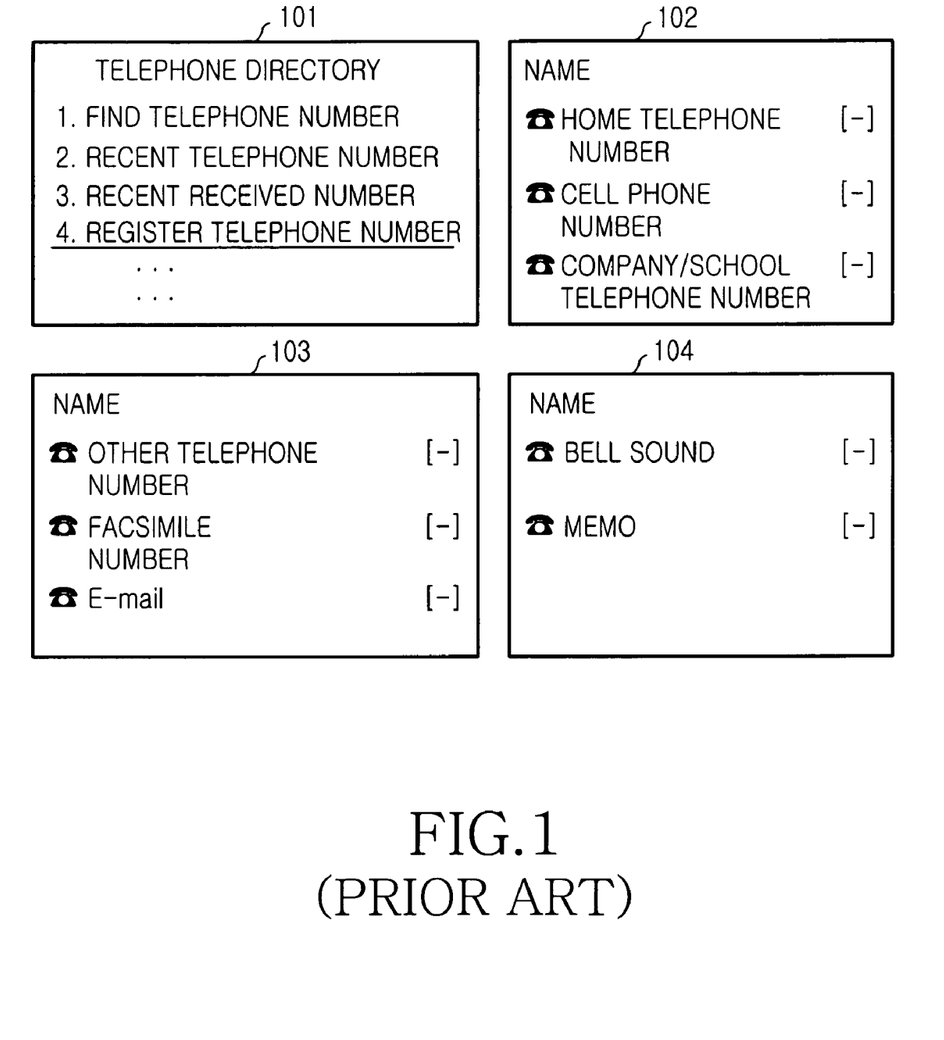
FIG. 1 is a view showing a telephone directory screen displayed in a conventional wireless terminal.

FIG. 1 is a view showing a telephone directory screen displayed in a conventional wireless terminal.

In order to input or modify new information in a telephone directory or an address book in the wireless terminal, a user must directly change to an input mode and input data by using a key pad. Further, when information regarding one person includes a facsimile number or an e-mail address in addition to a plurality of telephone numbers (e.g. a home telephone number, company/school telephone numbers, and cell phone number), the user is required to spend much more time and effort. Accordingly, as operations for inputting, modifying, or deleting information become complex, it becomes more troublesome and time-consuming for the user.

In FIG. 1, reference numeral 101 designates an initial address book screen. Further, reference numerals 102 and 103 designate screens sequentially displayed when an item '4. telephone number registration' is selected from the initial screen. That is, these screens are screens to which various telephone numbers, an e-mail address, a bell sound, and a memo, which can be inputted with respect to one name, are inputted. Further, when corresponding data are inputted, an abbreviation number corresponding to each data is displayed in a part marked by a symbol '[-]'.

Figure 2:
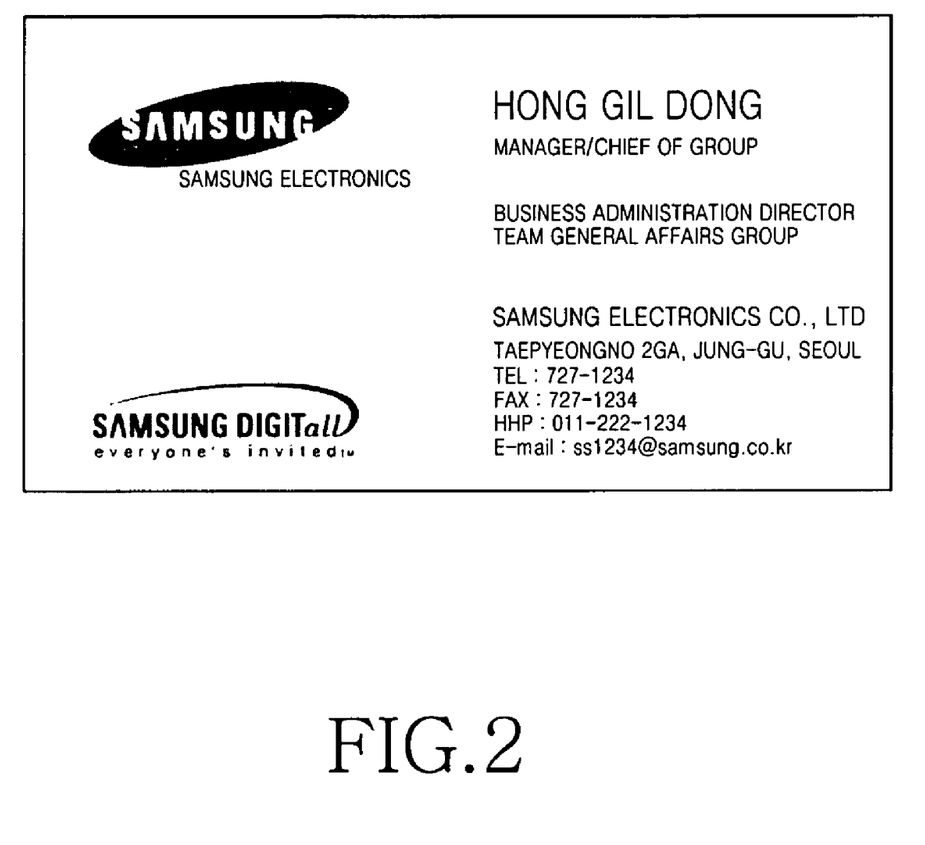
FIG. 2 is a view showing a card including various information.

FIG. 2 is a view showing a card including various information.

Typically, the card includes a name, a company name, a company address, a telephone number, a wireless terminal number, an e-mail address, and may further include other information. Most of the information is similar to the contents of an address book management menu in a wireless terminal. However, in order to store information, which is included in the card, in the wireless terminal such as a cell phone, since a user must directly read and select information one by one to input selected information, it takes more time and effort.

Further, incorrect information may be stored in the wireless terminal due to an error occurring when information is inputted.

SUMMARY OF THE INVENTION

Accordingly, the present invention has been made to solve the above-mentioned problems occurring in the prior art, and an object of the present invention is to provide an apparatus and a method for managing an address book in a portable wireless terminal, allowing a user to easily register information and manage the address book by means of a radio frequency identification (RFID) chip, which includes private or personal information.

An another object of the present invention is to provide a portable wireless terminal which can recognize an RFID chip and method of recognizing the RFID chip and information provided therein.

In order to accomplish the aforementioned objects, according to an embodiment of the present, there is provided an apparatus for managing an address book in a portable wireless terminal comprising: an RFID recognition section for receiving information transmitted from an RFID chip after transmission of an electric wave, storing and reading received information, and converting read data into data suitable for an address book; a display section for displaying data for management of the address book; a user command input section for inputting a command for the address book management by a user; an address book storage section for storing private information; and a control section for controlling an operation of the RFID recognition section, so as to transmit the converted data to the address book storage section according to a user command, thereby storing the data.

In order to accomplish the aforementioned objects, according to an embodiment of the present, there is provided a method for managing an address book in a portable wireless terminal comprising the steps of: transmitting an electric wave for an RFID recognition to an RFID chip; checking whether or not RFID information, which is transmitted from the RFID chip, is received after the electric wave is transmitted; storing information in a memory when received RFID information is related to an address book registration; converting information stored in the memory into data suitable for an address book of a corresponding portable terminal; displaying the converted data in the display section to ask a user whether or not the converted data are data to be registered in the address book; and storing the converted data in an address book storage section when the user want to register the converted data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the below description, many particular items are provided for helping the general understanding of the present invention, it will be understood by those skilled in the art that the present invention can be embodied without such particular items. In the following description of the present invention, a detailed description of known functions and configurations incorporated herein has been omitted when it may make the subject matter of the present invention unclear.

A radio frequency identification (hereinafter, referred to as an RFID) is a wireless identification technology emerging in an application field of a new frequency communication. The RFID collectively refers to apparatuses transceiving information of each product in wireless manner. In an identification method using the RFID, inherent IDs are assigned to all objects, thereby storing inherent ID information in RFID tags. Further, when the RFID tags are passed through a recognizer, the recognizer reads inherent ID information by communicating with the RFID tags.

A basic construction of the RFID may be divided into the tag and the recognizer, and the tag has different constructions according to a passive type or an active type. The following description assumes that the passive type RFID tag is used.

The passive type RFID tag includes an RFID chip storing information of a corresponding product and a high gain antenna. The passive type RFID tag not equipped with a power source generates an electromagnetic induction in the antenna by means of an electric wave generated in the recognizer and transmits information stored in the chip to the recognizer by means of electric power produced when the electromagnetic induction is generated. Next, the recognizer analyzes information, which is transmitted from the RFID chip, to be used. The transmitted information can be changed or modified to suit a corresponding product.

Figure 3:
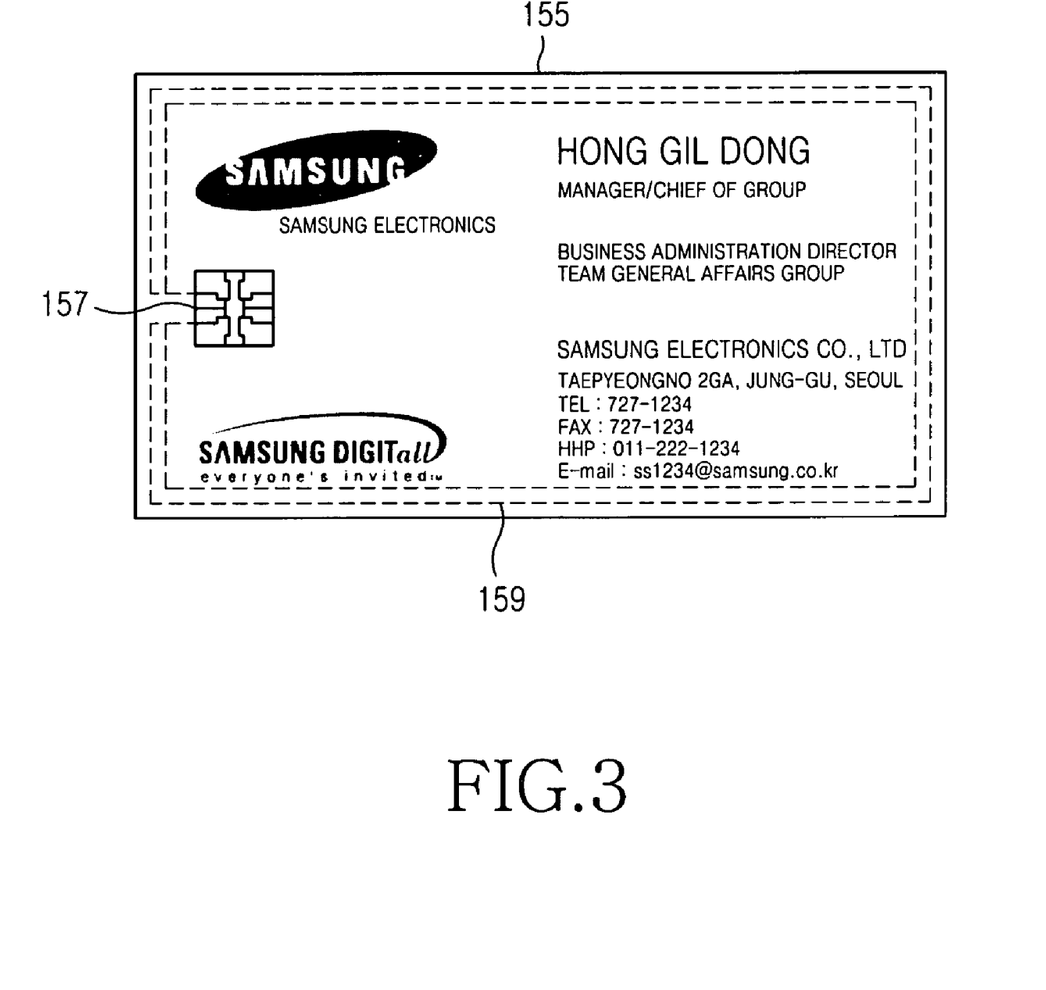
FIG. 3 is a view showing a card having a radio frequency identification (RFID) chip therein.

FIG. 3 is a view showing a card having an RFID chip therein.

The card 155 includes the same contents as that of the existing card shown in FIG. 2, but it has a difference in that an RFID chip 157 and an antenna coil 159 are accommodated in the card 155, in comparison with the existing card. Various types of RFID chips 157 and antenna coils 159 can be used. In addition, the size and shape of the RFID chip 157 and the antenna coil 159 can be changed.

The RFID chip 157 stores same information as various private information printed on the card 155. Further, in an operation of the RFID chip 157, the RFID chip 157 reads stored information and sends read information to a recognition section.

In order to enable operation of the passive type RFID chip 157 equipped without a separate electric power source, the antenna coil 159 receives an electric wave from an exterior source and generates an induced electromagnetic force, thereby producing electric power. Herein, the antenna coil 159 may be accommodated inside of a product or may be attached to a surface of the product by various means.

Figure 4:
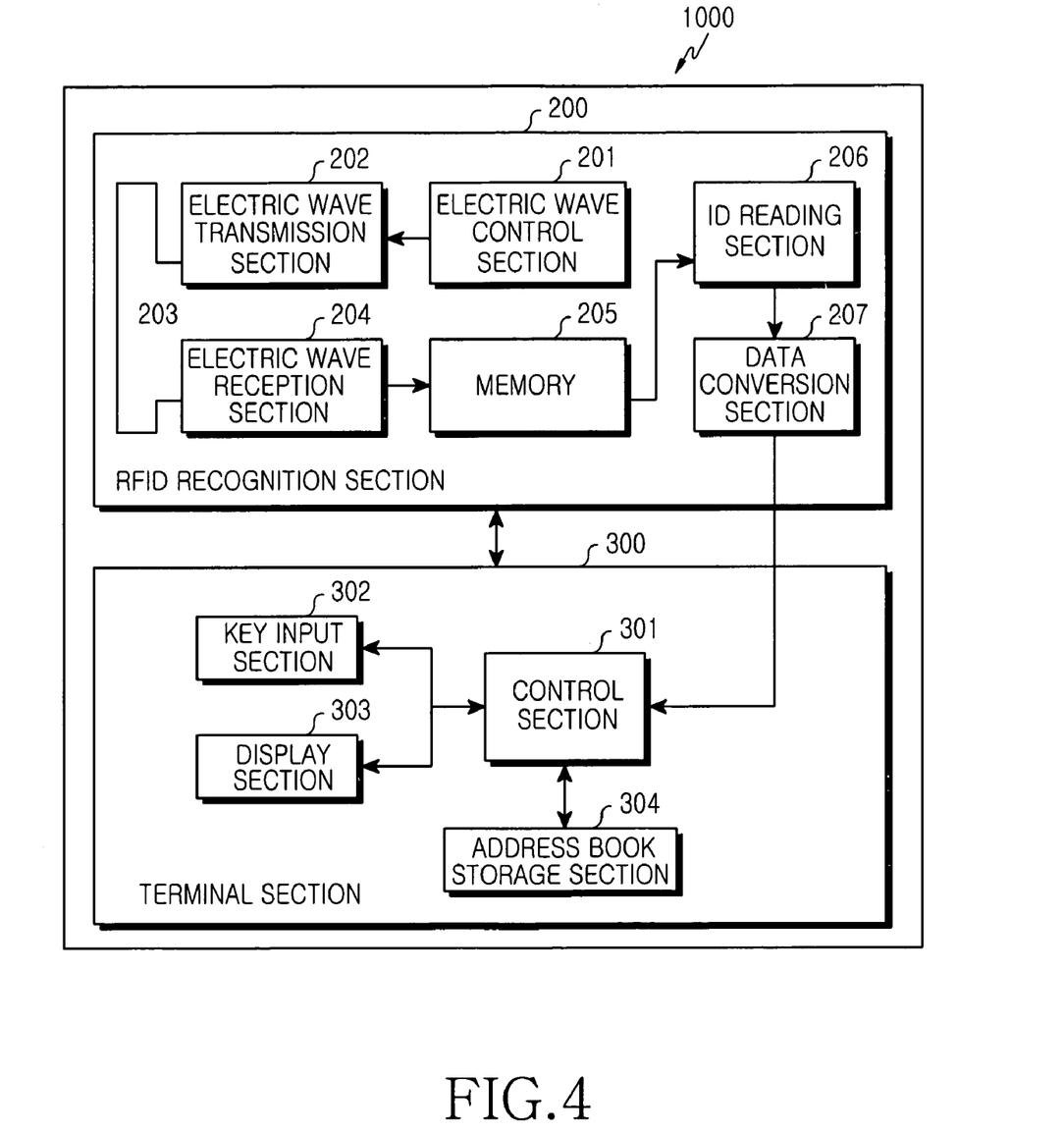
FIG. 4 is a block diagram of a portable wireless terminal including an RFID recognition section according to one embodiment of the present invention.

FIG. 4 is a block diagram of a portable wireless terminal including an RFID recognition section according to one embodiment of the present invention.

The wireless terminal may comprise a private information terminal such as a mobile communication terminal or a personal data assistant (PDA), or a complex terminal having more than one terminals.

According to one embodiment of the present invention, an apparatus 1000 for managing an address book in a portable wireless terminal includes a terminal section 300 for performing a general call communication and a PDA function and an RFID recognition section 200 for reading information stored in an RFID chip (not shown).

The RFID recognition section 200 includes an electric wave control section 201, an electric wave transmission section 202, an antenna 203, an electric wave reception section 204, a memory 205, an ID reading section 206, and a data conversion section 207.

The electric wave control section 201 controls the RFID recognition section 200 to transmit an electric wave, which has a frequency and a proper intensity corresponding to the RFID chip, and to operate the RFID chip. The electric wave transmission section 202 generates an electric wave according to control of the electric wave control section 201, and transmits the generated electric wave through the antenna 203. Herein, since the frequency and intensity of the electric wave has not been standardized yet, each country may employ different standards. Accordingly, necessary elements may be partially changed or modified according to the frequency and intensity of the electric wave.

When the electric wave is transmitted from the RFID recognition section 200 through the antenna 203, the RFID chip receives the electric wave and transmits information, which is stored in the chip, by means of the electric power generated by the electromagnetic induction in the high gain antenna (see the reference numeral 159 in FIG. 3).

Information is received in the RFID recognition section 200 through the antenna 203 so as to be sent to the electric wave reception section 204. The electric wave reception section 204 includes an amplification section for amplifying the electric wave when the received electric wave has a weak intensity, and an error detection section for detecting an error when the received electric wave has the error.

The memory 205 stores information received in the electric wave reception section 204.

The ID reading section 206 analyzes stored information. Since information is stored in digitized form, the ID reading section 206 analyzes digitized information, thereby reading out digitized information as private information.

However, since the address book in the portable wireless terminal has different types according to various factors such as a manufacturing company and a manufacturing year of the address book, information read by the ID reading section 206 cannot be directly stored in an address book of the terminal section 300. Accordingly, a means is necessary to convert data so as to be suitable for an address book type of a corresponding portable wireless terminal.

Information read by the ID reading section 206 includes an identifier representing the kinds of read information. Accordingly, after this identifier is detected, it can be determined whether or not corresponding information is to be stored in the address book on the basis of the detected identifier.

Hereinafter, a detailed description will be given with reference to the address book type in FIG. 1 and the card in FIG. 3. The card in FIG. 3 includes information such as a name, a position or title, a department, a company, a company address, a company phone number, a facsimile phone number, a cell phone number, and an e-mail address. In contrast, information fields provided in the address book in FIG. 1 include a name, home phone number, a cell phone number, a company phone number, other phone numbers, a facsimile phone number, and an e-mail address. As such, RFID information obtained in the card in FIG. 3 includes information (i.e. the position, the department, the company, the company address) which cannot be stored in the address book of the terminal as shown in FIG. 1. Accordingly, information read by the ID reading section 206 must be converted into data suitable for the address book type of the corresponding portable wireless terminal.

Information written in the card in FIG. 3 (i.e. the name, the position, the department, the company, the company address, the company phone number, the facsimile phone number, the cell phone number, and the e-mail address) are stored in the RFID chip 157 with standardized inherent identifiers (for convenience, the inherent identifier is expressed by "1x", wherein x=1, 2, 3, . . . ,) as shown in Table 1.

TABLE 1

| Identifier | 11 | 12 | 13 | 14 | 15 | 16 | 17 | 18 | 19 |
|---|---|---|---|---|---|---|---|---|---|
| Information | name | position | department | company | company address | company phone number | cell phone number | facsimile phone number | e-mail address |

The ID reading section 206 reads out the information corresponding to the identifier together with the identifier. Further, since the data conversion section 207 already has identifiers required according to the address book of the corresponding terminal section 300, the data conversion section 207 extracts information of identifiers necessary in the address book of the corresponding terminal section 300 from among information read by the ID reading section 206, thereby converting extracted information into address book data.

The identifiers required according to the address book of the terminal in FIG. 1, which are contained in the data conversion section 207, are as shown in the following Table 2.

TABLE 2

| Identifier | 11 | 16 | 17 | 18 | 19 | 110 | 111 |
|---|---|---|---|---|---|---|---|
| Information | name | company phone number | cell phone number | facsimile phone number | e-mail address | home phone number | other phone numbers |

That is, the data conversion section 207 obtains the information having identifiers necessary in the address book of the corresponding terminal section 300 from among information read by the ID reading section 206, so as to restructure the address book data, thereby transmitting the restructured data to a control section 301 in the terminal section 300. In contrast, the data conversion section 207 discards unnecessary data.

In the present embodiment as shown in FIG. 4, the data conversion section 207 is achieved in the RFID recognition section 200, but the data conversion section 207 may be an element of the terminal section 300. Further, the RFID recognition section 200 can be fabricated to be coupled to an exterior of the terminal section 300.

In this case, an ear phone jack or a universal asynchronous serial receiver and transmitter (UART) may be used as an interface between the portable wireless terminal and the external-type RFID recognition section 200. In another embodiment, there is a method of using a general terminal and a general RFID recognizer. Herein, the two terminals are connected with each other through an exterior device having a data conversion section. Accordingly, if the existing terminal and RFID recognizer can be used by means of the data converter, address book information can be easily inputted.

The control section 301 controls an inherent function of the portable terminal. In addition, in the present invention, the control section 301 not only displays data, which are transmitted from the data conversion section 207, through a display section 303, but also modifies data if a user inputs a data modifying signal through a key input section 302 after checking the displayed data, or stores the modified data. Since information related to the address book has been already converted by data conversion section 207 according to the corresponding terminal, information is stored in an address book storage section 304 according to a characteristic of each terminal after passing through the check and modification step.

Figure 5:
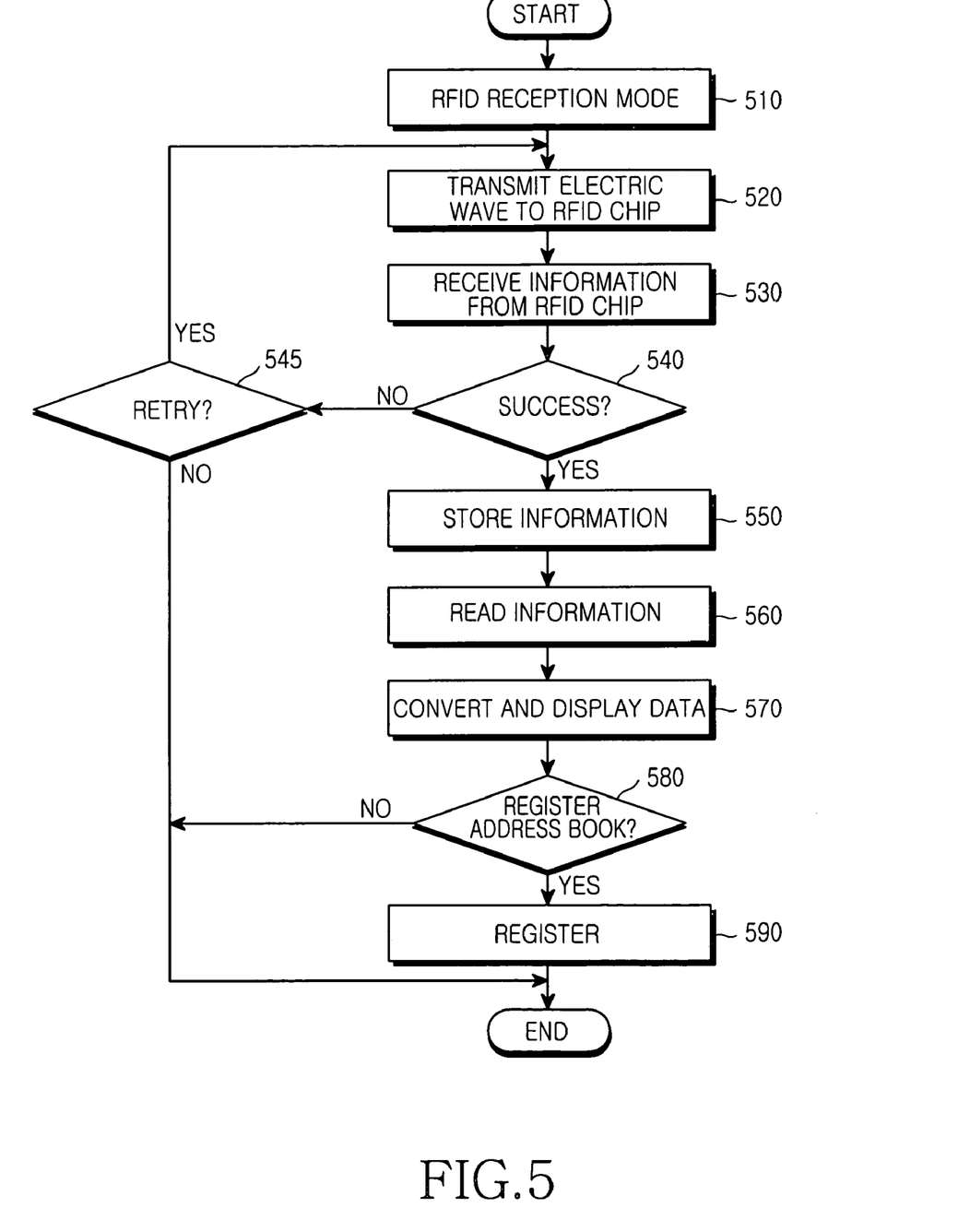
FIG. 5 is a flowchart illustrating a method for managing an address book in a portable wireless terminal according to one embodiment of the present invention.

FIG. 5 is a flowchart illustrating a method for managing an address book in a portable wireless terminal according to one embodiment of the present invention.

When a user requests a mode change to an RFID reception mode by using the key input section 302, the control section 301 in the wireless terminal section 300 recognizes the request to change to the RFID reception at mode step 510 and controls the RFID recognition section 200 to change the mode of the terminal into the RFID reception mode. That is, when the terminal is in a general mode, the control section 301 prevents the RFID information from being received in the terminal, so that battery consumption can be minimized. In contrast, when it is necessary to receive RFID information, the mode of the terminal is switched into the RFID information reception mode by appropriate hardware or software of the terminal. In order to actually receive information in the RFID reception mode, the electric wave transmission section 202 in the RFID recognition section 200 must generate an electric wave through the antenna 203.

In step 520, the control section 301 transmits a recognition start signal to the electric wave control section 201. Further, the electric wave transmission section 202 generates the electric wave having a predetermined frequency and intensity according to control of the electric wave control section 201 and then transmits the generated electric wave to the RFID chip through the antenna 203. Further, an induced electromagnetic force is generated in the high gain antenna by the electric wave transmitted as described above, and the RFID chip transmits stored information related to the private address book to the antenna 203 again.

In step 530 and 540, the control section 301 checks whether or not information is received in the electric wave reception section 204 and whether or not information is successfully received. From the result of the check, when received information includes an error or information is not normally received, the control section 301 controls the display section 303 to ask the user whether or not the user want to retry the information reception in step 545. Herein, when the user wants to retry the reception (i.e. when a retrying request input is performed by the user), step 520 is performed. In contrast, when the user does not want to retry the reception, procedure is ended.

From the result of the check, when RFID information is successfully received and is information related to an address book registration, information is stored in the memory 205 at step 550. Further, the control section 301 controls the ID reading section 206 to analyze the stored information. That is, the ID reading section 206 analyzes the digitized information stored in the memory 205. However, since the data read as described above includes general data, the control section 301 controls the data conversion section 207 to convert the read data into the data suitable for the address book of the corresponding portable terminal at step 570. Further, the control section 301 controls the display section 303 to display the data converted in step 570, so that the user checks whether or not the data are to be registered in the address book at step 580. Herein, the user sees information displayed in the display section 303 and can partially modify data by means of the key input section 302 or can directly order registration of the data without modifying the data, by means of the key input section 302. Herein, when the user wants to register the data, the data are stored in the address book storage section 304 at step 590.

In order to check whether or not information received in step 540 is information related to the address book registration, a code designating whether or not received information is information related to the address book registration can be recorded in a header part of a transmission frame.

In the present invention as described above, the address book of the portable terminal can easily register information or be managed by means of the RFID chip and the recognizer.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for managing an address book in a portable wireless terminal, the apparatus comprising:
   a radio frequency identification (REID) recognition section for receiving information transmitted from an RFID chip after transmission of an electric wave, storing received information and reading identifiers and data corresponding to the identifiers from received information;
   a data conversion section for converting the data corresponding to the identifiers into data suitable for the address book;
   a display section for displaying data for management of the address book;
   a user command input section for inputting a command for address book management by a user;
   an address book storage section for storing the converted data; and
   a control section for controlling an operation of the REID recognition section, so as to transmit the converted data to the address book storage section thereby storing the converted data in a field of the address book storage which corresponds to the identifiers, wherein the RFID recognition section comprises an electric wave control section for controlling an electric wave transmission section to transmit the electric wave having a frequency and an intensity corresponding to the RFID chip.

2. The apparatus as claimed in claim 1, wherein the RFID recognition section further comprises:
   an antenna;
   the electric wave transmission section for generating the electric wave for operating the REID chip to transmit the electric wave through the antenna;
   an electric wave reception section for receiving information transmitted from the RFID chip through the antenna;
   a memory for storing information received in the electric wave reception section;
   an ID reading section for analyzing digitized information stored in the memory to read out digitized information as private information; and
   the data conversion section for converting information read by the ID reading section into data suitable for the address book.

3. The apparatus as claimed in claim 2, wherein the electric wave reception section includes an amplification section for amplifying the electric wave when the received electric wave has a weak intensity.

4. The apparatus as claimed in claim 2, wherein the electric wave reception section includes an error detection section for detecting an error when the received electric wave has the error.

5. The apparatus as claimed in claim 2, wherein the electric wave reception section includes an amplification section for amplifying the electric wave when the received electric wave has a weak intensity, and an error detection section for detecting an error when the received electric wave has the error.

6. An apparatus for managing an address book in a portable wireless terminal, the apparatus comprising:
   a data conversion section;
   an RFID recognition section external to the terminal for receiving information transmitted from an RFID chip after transmission of an electric wave, storing and reading the received information, and structuring address book data using the read information so as to be suitable for the address book, wherein the data conversion section is included in the RFID recognition section;
   a display section for displaying data for management of the address book;
   a user command input section for inputting a command for address book management by a user;
   an address book storage section for storing information; and
   a control section for controlling an operation of the RFID recognition section, so as to transmit converted data to the address book storage section according to a user command, thereby storing the data, wherein the RFID recognition section comprises an electric wave control section for controlling an electric wave transmission section to transmit the electric wave having a frequency and an intensity corresponding to the RFID chip.

7. The apparatus as claimed in claim 6, wherein the data converted by the external RFID recognition section are transmitted to the terminal through an ear phone jack.

8. The apparatus as claimed in claim 7, wherein the data converted by the external RFID recognition section are transmitted to the terminal through a universal asynchronous serial receiver and transmitter.

9. A method for managing an address book in a portable wireless terminal, the method comprising the steps of:
   a) controlling an electric wave transmission section to transmit an electric wave having a frequency and an intensity corresponding to the RFID chip and transmitting the electric wave for an RFID recognition to an RFID chip;

b) determining whether RFID information, which is transmitted from the RFID chip, is received after the electric wave is transmitted;

c) storing received information in a memory when received RFID information is related to an address book registration;

d) converting the data corresponding to the identifiers into data suitable for the address book of a corresponding portable terminal;

e) displaying the converted data in a display section of the terminal to ask a user whether the converted data are data to be registered in the address book; and f) storing the converted data in an address book storage section when the user wants to register the converted data.

10. The method as claimed in claim 9, further comprising a step of determining whether the wireless terminal is in an RFID reception mode, and performing step a) when the wireless terminal is in an RFID reception mode.

11. The method as claimed in claim 9, wherein step e) includes a substep of a user viewing information displayed in the display section to modify data by using a key input section.

12. The method as claimed in claim 9, wherein the step of storing information includes the step of determining whether or not received information is information related to the address book registration, and the determining step is performed by detecting a code recorded in a header part of a transmission frame.

13. An apparatus for managing an address book in a portable wireless terminal, the apparatus comprising:

a display section for displaying data for management of an address book;

a user command input section for inputting a command for address book management by a user;

an address book storage section for storing information;

a portable wireless terminal including a control section for receiving data from an external device and enabling the received data to be stored in the address book storage section according to the user's request based on identifiers extracted from the received data;

an RFID recognition section for receiving information transmitted from an RFID chip receiving an electric wave after transmission of the electric wave, and storing and reading received information, wherein the RFID recognition section comprises an electric wave control section for controlling an electric wave transmission section to transmit the electric wave having a frequency and an intensity corresponding to the RFID chip; and a data conversion section for structuring address book data using the information read by the RFID recognition section so as to be suitable for the address book of the portable wireless terminal, thereby transmitting the converted information to the control section of the portable wireless terminal.

14. The apparatus as claimed in claim 13, wherein the data converted by the data conversion section are transmitted through an ear phone jack.

15. The apparatus as claimed in claim 13, wherein the data converted by the data conversion section are transmitted through a universal asynchronous serial receiver and transmitter.

* * * * *